United States Patent
Gioia

(10) Patent No.: US 6,677,949 B1
(45) Date of Patent: Jan. 13, 2004

(54) SIMPLIFYING AND ENCODING A SOURCE MESH

(75) Inventor: Patrick Gioia, Rennes (FR)

(73) Assignee: France Telecom, Paris (FR)

( * ) Notice: Subject to any disclaimer, the term of this patent is extended or adjusted under 35 U.S.C. 154(b) by 0 days.

(21) Appl. No.: 09/744,501

(22) PCT Filed: Aug. 8, 1999

(86) PCT No.: PCT/FR99/01923

§ 371 (c)(1),
(2), (4) Date: Mar. 19, 2001

(87) PCT Pub. No.: WO00/08603

PCT Pub. Date: Feb. 17, 2000

(30) Foreign Application Priority Data

Aug. 3, 1998 (FR) ............................... 98 10094

(51) Int. Cl.⁷ .............................................. G06T 17/00
(52) U.S. Cl. ....................................... 345/428
(58) Field of Search ................ 345/418, 419, 345/427, 428

(56) References Cited

FOREIGN PATENT DOCUMENTS

EP        784 295        7/1997

OTHER PUBLICATIONS

"Including shape handles in recursive subdivision surfaces"; Brunet, P.; Computer Aided Geometric Design 5; 1988; pp 41–50; XP–002085289.

"A Comparison of Mesh Simplification Algorithms"; Cignoni, P.; Montani, C.; Scopigno, R.; Computer & Graphics, vol. 22, No. 1, pp. 37–54; 1998.

"Efficient Triangular Surface Approximation Using Wavelets and Quadtree Data Structures"; Gross, M.; Staadt, O.; Gatti, R.; IEEE Transactions on Visualization and Computer Graphics; vol. 2, No. 2; Jun. 1996; XP000637707.

"Geometric Optimization"; Hinker, P.; Hansen, C.; XP000475427; pp. 189–195 + CP18; Oct. 1993.

*Primary Examiner*—Cliff N. Vo
(74) *Attorney, Agent, or Firm*—Merchant & Gould P.C.

(57) ABSTRACT

The invention concerns a method for coding an original source mesh (M) representing a three-dimensional object, which consists in determining a simple mesh ($M_0$) having reduced number of facets each defined by vertices and edges, then coefficients in a wavelet base, corresponding to the local modifications of said simple mesh ($M_0$). The determination (11) said simple mesh ($M_0$) comprises the following steps: detecting in said original mesh (M) at least one line of discontinuity and assigning said line of discontinuity to at least one of the facets of the simple mesh ($M_0$) to be an edge thereof.

13 Claims, 3 Drawing Sheets

SIMPLIFYING AND ENCODING A SOURCE MESH

The field of the invention is that of the encoding of images or image elements. More specifically, the invention relates to the adaptive representation and encoding of scenes (or objects of a scene) in three dimensions (3D) represented by meshes.

The invention can be applied in all fields where it is desirable to reduce the number of information elements needed for the efficient depiction, storage and/or transmission of a digital image. For example, the invention may be used to transmit images through the Internet. In this context, it enables the animation of 3D scenes with real-time display although the bit rate is neither constant nor ensured. In this case, the invention may be a primitive of a data transmission language such as VRML.

Other applications that may be envisaged include the storage of animated data on CD-ROM (or an equivalent data carrier), multiple-user applications, digital television, etc.

The invention proposes an improvement to the methods known as "wavelet" methods used to represent a mesh as a sequence of details added to a basic mesh. The general theory of this technique is described especially in the article by M. Lounsberry, T. DeRose and J. Warren, "Multiresolution analysis for surfaces or arbitrary topological type" (ACM Transaction on Graphics, Vol. 16, No. 1, pp. 34–73).

A method of implementation is presented in the article by M. Eck, T. DeRose, T. Duchamp, H. Hoppe, M. Lounsberry and W. Stuetzle, "Multiresolution analysis of arbitrary meshes" (Computer Graphics Proceedings 1995). It proposes to use the technique of partition known as the "Delaunay triangulation" method, for multiple resolution meshes.

The method of Eck et al. comprises the following steps:
given a mesh M, ideally a Delaunay triangulation is done of this mesh, namely a special partition of its surface into "topologically triangular" zones;
from this triangulation, a simplified mesh $M_0$ is deduced in obtaining a correspondence between a triangular facet at each component of the partition;
the parametrization $\rho$ between $M_0$ and M is determined facet by facet in minimizing a particular elastic energy. Thus, an approximation of a harmonic function, which has the advantage of being bijective, is obtained;
with $\rho$ available, the filters are applied to obtain the wavelet coefficients.

This technique has a certain number of drawbacks, especially with regard to the length of the computation times and the efficiency of the data compression obtained.

Furthermore, it is necessary for all the data to be transmitted to the terminal so that the object can be reconstructed in a recognizable way. Now, in many applications, it is desirable that this object should be capable of being reconstructed in successive phases (roughly to begin with and then by successive refining operations). More generally, the visual fidelity of the depictions of the object according to the known method is not always ensured.

In particular, it is an aim of the invention to overcome these drawbacks of the prior art.

More specifically, it is a aim of the invention to provide a method for the encoding of a source mesh, that provides a gain in compression, namely a reduction in the number of wavelet coefficients, as compared with prior art techniques.

Another aim of the invention is to provide a method of this kind with higher geometrical fidelity or visual fidelity towards the source object.

It is also an aim of the invention to provide a method of this kind enabling a very swift successive reconstruction of the object, the object being recognizable, in a rough depiction.

Similarly, another aim of the invention is to provide a method of this kind to adapt the degree of precision of the reconstruction of an object to various criteria such as the power of the terminal, the available bit rate, the position of the object in the scene, a choice of the user, etc.

These goals as well as others that shall appear hereinafter are achieved according to the invention by a method for the encoding of a source mesh (M) representing an object in three dimensions, in which a simple mesh ($M_0$) is determined, this simple mesh having a limited number of facets each defined by vertices and ridges, and then coefficients in a wavelet base, corresponding to local modifications of said simple mesh ($M_0$), a method according to which the determining of said simple mesh ($M_0$) comprises the following steps:

the detection in said source mesh (M) of at least one line of discontinuity;

the assignment of said line of discontinuity to at least one of said facets of the simple mesh ($M_0$) as a ridge.

In other words, the invention is based especially on the observation that the prior art does not take account of the lines of discontinuity, namely sets of contiguous ridges forming big angles in the vicinity of zones that may be considered to be smooth.

Furthermore, it will be noted that the steps of detection and assignment are performed during a single processing operation. It is not necessary to know or make a preliminary search for all the discontinuities to carry out this processing operation since the detection forms parts of this operation.

The term "discontinuity" is understood, in the present patent application, to mean any set of attributes of contiguous facets that is contained in at least two facets and has a difference greater than at least one threshold (possibly variable) according to a predetermined criterion.

As is described hereinafter, it may be a geometrical attribute or an attribute of orientation. In this case, a discontinuity may be a set of contiguous ridges such that each of the ridges is contained by at least two facets forming a non-negligible angle depending on the criterion chosen.

More generally, the invention can be applied to any specific attribute of the facet such as the color or texture. For example, it may be planned that a discontinuity will be detected if the current difference is great.

Naturally, several criteria of discontinuity may be considered for one and the same mesh (color and orientation for example).

According to the invention, by contrast, the discontinuity lines are directly approached by segments and not by internal parts of faces. In this latter, which is encountered with a Delaunay triangulation, it is indeed necessary to go much further with the subdivision of the facets in the remesh, leading to the creation of wavelet coefficients at superfluous levels of detail (or even to represent a mesh such as the infinite sum of the details whereas a finite number would have been enough to represent it exactly).

The fact that a Delaunay triangulation cannot be used to specify the lines of discontinuity as images of ridges of the mesh $M_0$, unlike the invention, explains the inefficiency of this method both for encoding and gradually transmitting meshes with lines of discontinuity. Conversely, it will easily be understood that the invention enables a rough reconstruction, the simple mesh $M_0$ already enabling a rough reproduction.

It must be noted that the observation of the usefulness of taking account of discontinuities is not obvious to those skilled in the art. It relies on a new approach in which it is first of all the object to be processed that is considered while those skilled in the art generally seek to improve the general, mathematical aspects of the problem. Furthermore, it provides an efficient and simple response to crucial problems for which substantial research has been made without achieving this result.

Advantageously, said determining of the simple mesh ($M_0$) comprises a step of searching for zones or components of said source mesh (M) constituted by facets of said source mesh (M) meeting a predetermined coplanarity criterion, comprising said steps of detection and assignment.

According to a preferred embodiment of the invention, said step of detection of a line of discontinuity comprises a step of comparison of the angle formed by two facets of said source mesh at a predetermined threshold angle $E_1$, the ridge between said facets being considered to be a line of discontinuity if said angle is greater than said threshold $E_1$.

Advantageously, said step of searching for components that meet a criterion of coplanarity implements, for the incorporation of a facet of said source mesh in one of said components, at least one of the following operations:

the detection of a major variation on the entire said component;

checking the topological connectedness of said component.

In particular, said operation for detecting a major variation may comprise a comparison of the maximum angle formed by said facet to be incorporated and all the other facets of said component is smaller than a predetermined threshold $E_2$.

Furthermore, said operation to check the connectedness advantageously comprises the limiting of the cardinal of said component to a predetermined limit M.

In this case, if said component is not simply a connected component, then the step of searching for a component can be reiterated with a new value of said limit M that is smaller than the previous one.

Advantageously, the method also comprises a step of combining components when they belong to a portion of said source mesh (M) meeting a criterion of large-scale approximate planeity.

This aspect is complementary to the one described earlier and relics on the same approach. It proposes an improvement, in terms of efficiency, of the third step of Eck's method described in the introduction (the first characteristic of the invention, for its part, improves the first step of this same method).

The combining step may for example implement a computation of the mean normal for each of said components, two components possibly being combined if the angle between their mean normals is smaller than a predetermined threshold.

Then, preferably, from said components, the simple mesh ($M_0$) and the image are determined by a predetermined parametrization of the ridges of said simple mesh ($M_0$).

Thus, according to a preferred embodiment, for each of said components, a curve in $R^3$ is built such that:

said curve is a union of said segments;

if a vertex on the edge of said component belongs to at least two other components, then it belongs to said curve;

if two vertices belonging to at least two other components are connected by a path that is contained in the edge of said component and that contains no other path having this property, then the segment defined by said two vertices belongs to the curve, and vice versa.

Said components are then, advantageously, subdivided into triangular facets corresponding to the simple mesh ($M_0$).

Preferably, the determining of said coefficients in a base of wavelets implements a subdivision in each of said facets of the simple mesh ($M_0$) corresponding to the definition of new vertices on said ridges.

According to an advantageous embodiment, the internal mesh, represented by the image of the new internal points of each of said facets of the simple mesh ($M_0$), is not memorized but deduced from said new vertices.

For example, the image of the new internal points may be determined by one of the following techniques:

the association, with each ridge middle, of the middle of the path representing its image;

the association, with each ridge middle, of the point of the corresponding path minimizing the distance of Hausdorff between this path and the two new segments formed.

With the images of the points of the edges of the facets representing a component being determined, the images of the internal points are for example determined according to the following techniques:

projection;

computation of the corresponding harmonic function;

minimizing the number of subdivisions for a predetermined precision.

The method of the invention can be applied advantageously to many fields, especially:

the display of meshed objects in three dimensions on a screen;

the gradual display of meshed objects in three dimensions on a screen, said wavelet coefficients being taken into account as and when they arrive;

the display of the meshed objects in three dimensions on a screen on at least two levels of detail, one level of detail corresponding to a subset of said wavelet coefficients;

the display of different parts of a meshed object with at least two different levels of detail;

the compression of a mesh of a meshed object.

Other features and advantages of the invention shall appear more clearly from the following description of a preferred embodiment of the invention given by way of a simple non-restrictive illustration and from the appended drawings, of which:

Figure 1:
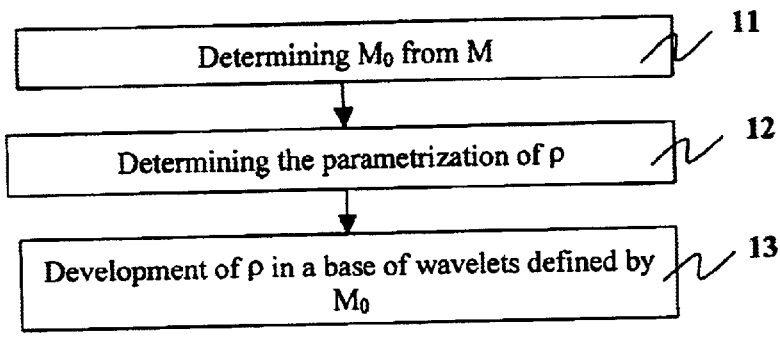
FIG. 1 is a simplified flow chart of the principle of the wavelet encoding method which is known per se.

The context of the invention therefore is the multiple-scale representation of a meshed object according to the methods known as wavelet methods whose general principle is illustrated in FIG. 1.

A method of this kind can be broken down into three major steps:

the determining 11 of a simple mesh $M_0$ from a source mesh M to be encoded;

the determining 12 of a parametrization ρ;

the development 13 of ρ in a base of wavelets defined by $M_0$.

The appendix (which is part of the present description) describes the different operations in greater detail.

The invention relates more specifically to step 11 for determining a simple mesh $M_0$. As indicated already, the invention proposes especially to define the lines of discontinuities as images of ridges of $M_0$. In this way, these lines are progressively approached at the time of the remeshing by the successive divisions of the ridges $M_0$ which immediately, i.e. as soon as the first level of detail is reached, render the impression of discontinuity of the normal.

The advantages lies especially in a gain in compression, namely in number of wavelet coefficients, as well as in geometrical fidelity. The lines of discontinuities are directly represented by ridges and are no longer approached by even zones. For the same reasons, since the mesh $M_0$ already comprises the lines of discontinuities of M, it has greater resemblance to the original mesh and may therefore be used directly as a rough depiction of M, without any addition of preliminary details as was the case with the earlier methods.

The successive modifications made by the wavelet coefficients therefore correspond truly to complementary details and no longer to modifications of the total shape of the object, which is now set up as soon as the first representation is made.

In the embodiment described, the method of the invention has been implemented in language C on a PC type microcomputer. It has been incorporated in a method of parametrization-breakdown-reconstruction which, in taking a mesh M at input represented as a union of facets (a list of points followed by a list of facets whose vertices are among these points), determines a mesh $M_0$ and a parametrization of M by $M_0$ and then develops this parametrization in a base of wavelets and sends back the coefficients of wavelets, sorted out by decreasing norm, to output. Using these coefficients, the method can also reconstruct the remeshed object with a certain level of detail or completely display M progressively.

The different steps of the implementation may sometimes have local variants that are independent of each other and will therefore be specified as and when they take place.

The input file describing the mesh M is a text file containing the list of the points of the mesh followed by the list of the triangular facets described by three points of the previous list. It is memorized with relationships of adjacency between vertices and between facets as well as various information elements such as the color of the facets or the texture coordinates.

The relationships of adjacency between faces enable the preparation of a graph whose vertices are the faces and whose arcs are the relationship of division of a ridge. It is with this graph that the mesh M will be partitioned into simply connected components that cannot contain the lines of discontinuity except on their edge.

To this end, the operation starts with the choosing of any facet whatsoever on the mesh, which will be in the first component. A list L of facets to be processed is drawn up. This list is reduced at the outset to the facet considered. The processing of a facet consists in eliminating it from the list and then adding it to its neighbors which ascertain a certain criterion of coplanarity, an example of which is given hereinafter.

Thus, a propagation is obtained of the component on the graph according to the criterion chosen. The operation stops when the list is empty, namely when there is no longer any point in the neighborhood of the component considered that verifies the criterion of coplanarity.

This criterion must make it possible to propagate on relatively flat zones without going through lines of discontinuities. For example, it is possible to authorize the propagation from one facet to another only if the following three conditions are met:

the angle formed by the two facets is smaller than a threshold $E_1$;

the maximum angle formed by the tested facet and all the facets of the component do not exceed a threshold $E_2$;

the cardinal of the component does not go beyond a limit M.

The first condition is dictated naturally. The second prevents propagation in places that are "locally smooth" but have major variations on a greater scale. The third condition complements the second one but also enables controlling the topological type of the component so that it is simply a connected component, which is not necessary, as in the prior art methods, but preferable from the viewpoint of the regularity of the remeshing that will be carried out on the component.

Thus, once a component has been determined, a test is made to ascertain that it is truly a simply connected component and, if this test fails, the operation starts again in diminishing the limit M which may be chosen at the outset as a percentage of the number of total facets of the mesh M.

At the end of a partitioning, it may happen that the first condition has been excessive and has prevented the combining of facets which, although they form big angles with each other, are located on a portion of the mesh that is fairly flat on the large scale.

To correct these formations of unnecessary components, a mean normal is computed for each component, and used in order to combine some of them. For example, if a component proves to have an excessively small cardinal with respect to its neighbors, it may be amalgamated with the one that has the closest mean normal. Similarly, two components of any size may be merged if the angle between their mean normals does not exceed a threshold.

In this partitioning, there is a deducing of both the basic mesh $M_0$ and the image by the parametrization sought of the ridges of $M_0$: for each component, the curve is constructed in $R^3$ defined as follows:

the curve is a union of segments;

if a vertex on the edge of the component considered belongs to at least two other components, then it belongs to the curve;

if two vertices a and b belonging to at least two other components are connected by a path contained in the edge of the component and containing no other point having this property, then the segment [a,b] belongs to the curve and vice versa.

Figure 4:
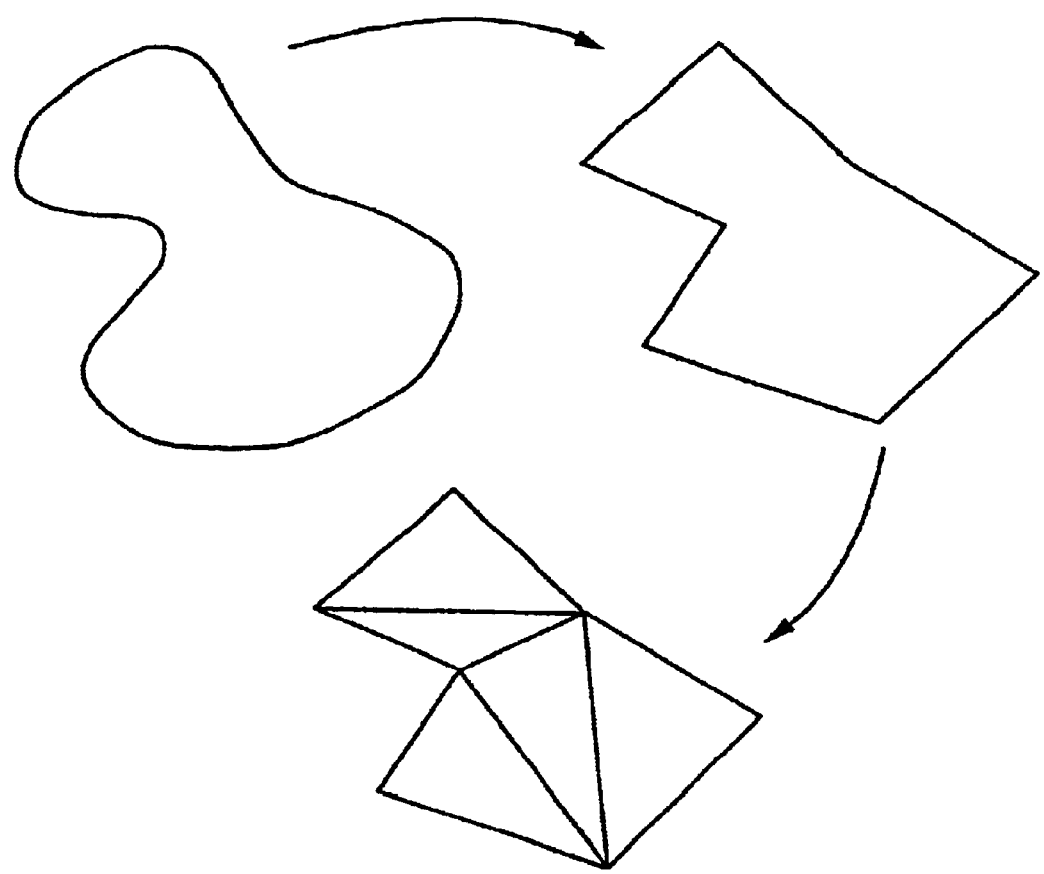
FIG. 4 illustrates the principle of the triangulation of a component.

If the components are simply connected components, these curves are closed and connected. These curves may be reduced to a plane on which they demarcate a domain that is triangulated, according to the principle shown in FIG. 4. This triangulation induces a set of triangular facets in $R^3$, the ridges of which contain the initial curve. The mesh $M_0$ is defined as the set of all the facets thus created by the partition of M into plane components.

The edges of the components are declared to be the image of the ridges of $M_0$ belonging to the initial curves, ridge by ridge. Thus, if we consider all the facets of $M_0$ generated by a particular component, there is a total image of each ridge on the edge of this unit, in the form of paths which are curves on the initial mesh M.

The successive subdivisions of the facets considered induce subdivisions of the ridges of the edge which may be represented by the appearance of new vertices on these edges. It may be advantageous to determine the restriction of the parametrization to all these new points and then deduce therefrom the internal remeshing, namely the image of the new internal points.

The image of the points of the edge depends on the shape desired for the remeshing. If it is sought to obtain faces that are fairly homogeneous in area, for example with a view to applying a Gouraud smoothening, then it is possible, with each ridge middle, to associate the middle (lengthwise) of the path representing its image. However, if it is desired to minimize the number of subdivisions for a given degree of geometrical precision, then it is possible to define, as the image of the middle of the segment, the point of the corresponding path that minimizes the Hausdorff distance between this path and the two new segments formed.

With the images of the points of the edge of the set of facets representing the component being determined, the images of the internal points may be chosen either by projection, if the component is flat enough, or by computation of the corresponding harmonic function, namely the unique homeomorphism of the set of the facets representing a component for which the image of the edge is fixed and which is the minimum metrical dispersion. It is also possible to use a hybrid method designed to minimize the number of subdivisions for a given precision and thus minimize the number of wavelet coefficients.

Once determined, the parametrization is memorized in a form adapted to the development in wavelets: the remeshing is represented solely by a list of vertices that point to the two ends of the segment that had been subdivided to give birth to them. This information is sufficient during the use of wavelets having a relatively limited support (namely "lazy wavelets" or "o-disk wavelets"). In all the other cases, it is necessary, for each vertex, to add the set of its neighbors.

The analysis phase which breaks down the remeshing into a list of wavelet coefficients may then be done naturally.

Figure 2:
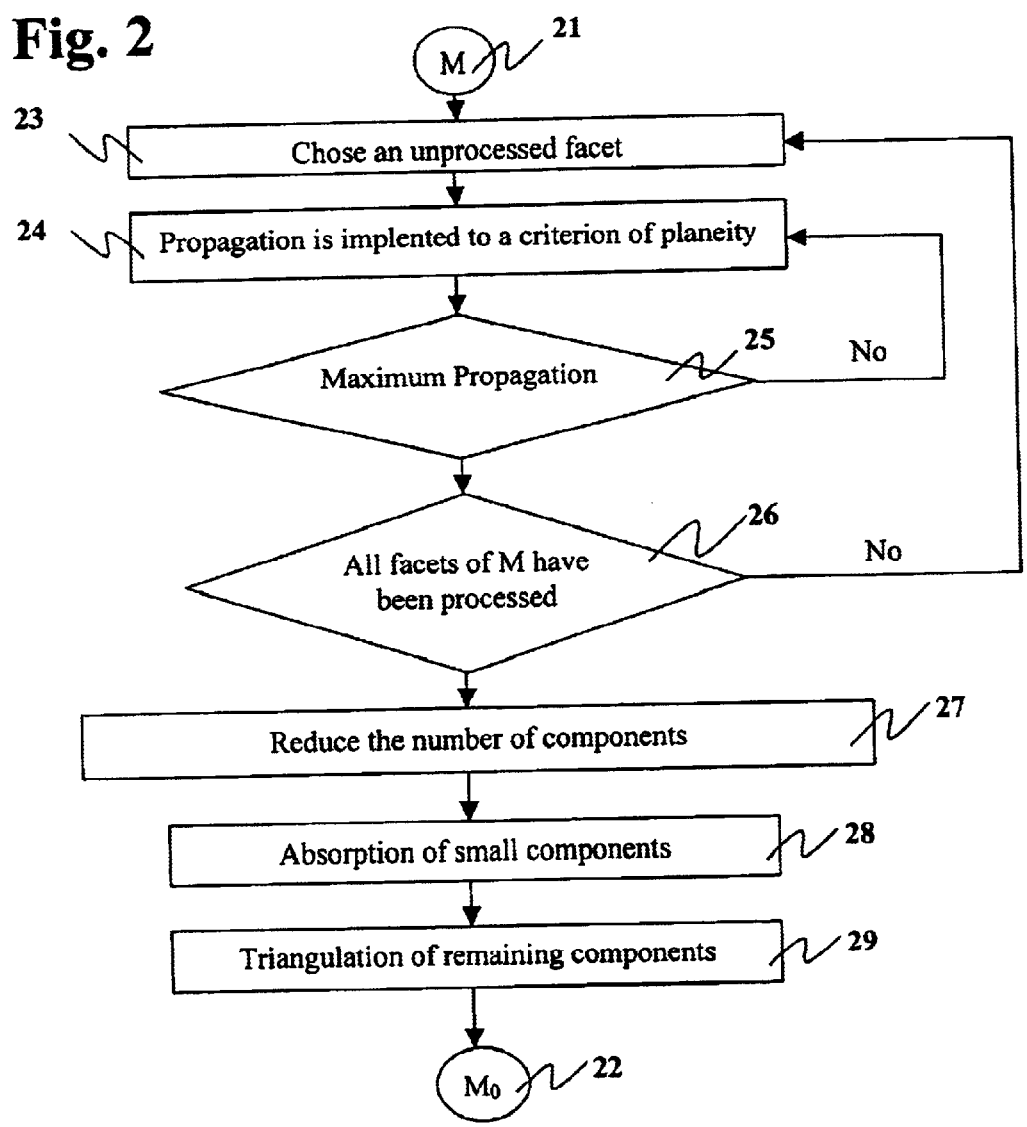
FIG. 2 is a flow chart breaking down the path of determining the simple meshing $M_0$ of FIG. 1 according to the method of the invention.

The method described here above can be illustrated by the flow chart of FIG. 2. This algorithm is briefly commented upon with reference to the exemplary processing of FIGS. 3A to 3D (illustrating a rabbit in three dimensions). For further details, reference may be made to the above description.

Figure 3A:
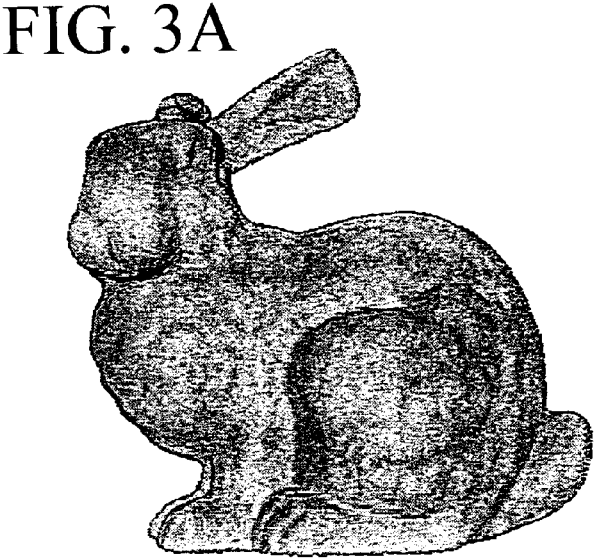
FIGS. 3A to 3D are examples of the processing performed on an exemplary object.
Figure 3B:
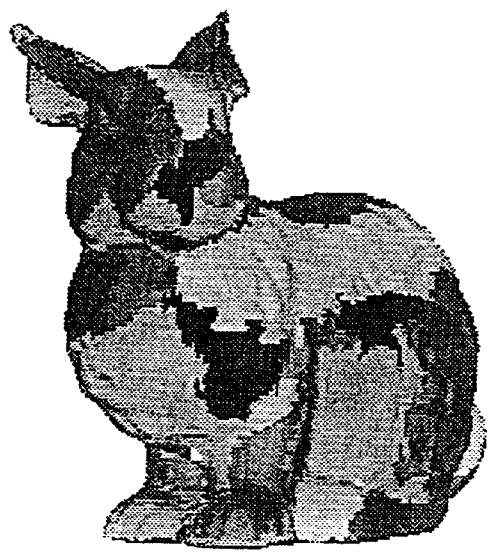
Figure 3C:
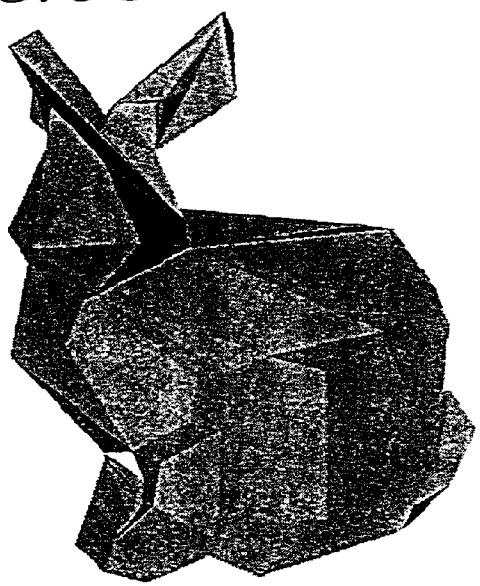
Figure 3D:
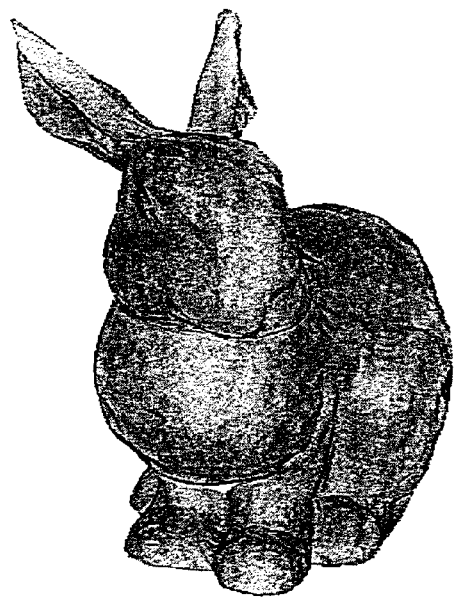

At the outset, we consider a source mesh M 21 (illustrated in FIG. 3A) and it is sought to obtain a simple mesh $M_0$ 22 (illustrated by FIG. 3C).

First of all an unprocessed facet (23) is chosen in the mesh source 21 which takes the form of a list of triangular facets. Using this selected facet, a search is made (24) for the neighboring facets likely to be combined with the selected facet because they form part of one and the same substantially plane surface (namely a surface without discontinuity). In other words, a propagation is implemented from facet to facet of the source mesh according to a criterion of planeity to determine relatively plane maximized zones.

To check this propagation, a test 25 for checking the maximum propagation is carried out after each addition of facets. What is done, in particular, is to interrupt the propagation if a discontinuity (an angle greater than $E_1$ between two neighboring facets) is detected but also to check the progress, on the larger scale, of the entire grouping, or component (checking of an angle greater than $E_2$ between any two facets and checking of the connectedness of the component).

When the maximum propagation is achieved, it is ascertained (26) that all the facets of M have been processed. If not, the step 23 is resumed for a new facet.

Once all the facets have been processed, it is again attempted to reduce the number of components (27) by combining those considered to be coplanar on an average. More specifically, the components whose angle between the mean normals is below a threshold are merged.

Then, it is attempted to eliminate the small-sized components (28) by combining them with a neighboring component having the closest mean normal.

Thus, a partitioning of the type shown in FIG. 3B is illustrated.

For each remaining component, a triangulation (29) is made as shown in FIG. 3 according to a technique known per se chosen according to need.

This processing is used to obtain the mesh $M_0$ as illustrated in FIG. 3C. It will be noted that the rabbit is already recognizable, at this level, in a rough form. This representation is then refined. The complete reconstruction, on the basis of wavelet coefficients, is used to obtain the result of FIG. 3D which is very close to the initial mesh (FIG. 3A).

It must be noted that certain steps and especially the steps 27 and 28 are optional. Furthermore, other selection criteria than those indicated may be used (as replacements or in combination), especially for the steps 25, 27, 28 and 29.

This example is based on the orientation of the facets. It will easily be understood that other attributes of the facets, such as the color or the texture, may be processed in the same way (independently or simultaneously, according to need).

As indicated in the introduction, the invention can be applied in many fields. It can be used indeed to diminish the number of coefficients transmitted to represent a mesh, hence to make speedier transmission of the surroundings in the context, for example, of interactive navigation.

In addition to their intrinsic properties of compression, the wavelet coefficients may be quantified according to the standard techniques of encoding in order to augment the compressive gain.

This gain can obviously benefit from the storage of scenes comprising meshed objects thus enabling the terminals to keep the totality of the displayed scene in memory.

Furthermore, the invention is used for a gradual transmission corresponding to a succession of additions of details instead of modifications of the total form of the objects, enabling an immediate use of the objects being transmitted without having to wait for the availability of a version that is faithful enough to be displayed.

This gradual transmission may be done comprehensively on the objects, namely by sorting out the coefficients by decreasing norm, or locally so as to detail a particular zone by sorting out the coefficients according to the position of the disturbances that they provoke.

APPENDIX

The general method used to encode and reconstruct meshes through wavelets consists in finding a mesh comprising few facets that are homeomorphous with the initial meshing as well as a homeomorphism that passes from one to the other. This homeomorphism or parametrization belongs to the vector space of the continuous functions defined on the simple mesh and may therefore be developed in a base of this space. In particular, the wavelet bases give rise to hierarchical developments that are particularly well suited to the notion of details that it is desired to exploit in the encoding and gradual transmission of meshes.

Figure 5:
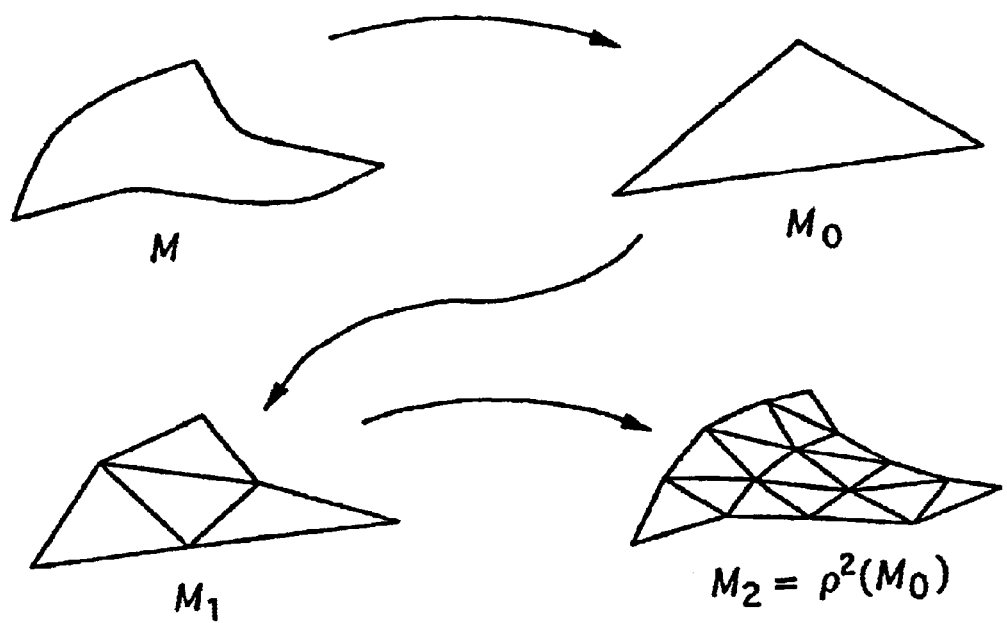
FIG. 5 shows an exemplary parametrization of a mesh by successive subdivisions discussed in the appendix.

Thus, with a mesh M to be encoded being available, the operation starts by finding a mesh $M_0$ that is of the same topological type as M but comprises few facets. Then a remeshing of M is made from $M_0$ by subdividing the facets of $M_0$ and by modifying their position to approach M, thus creating a mesh $M_1$. The same procedure is carried out with $M_1$ and so and so forth until the mesh $M_j$ is close, within a given error tolerance $\in_1$, to the initial mesh M. It is this remeshing that induces a parametrization of M by $M_0$ (FIG. 5).

The wavelet bases enable the depiction of the parametrization as a sum of local modifications of $M_0$. The data element of the mesh $M_0$ and of these modifications is sufficient to represent the initial mesh M.

In practice, the operation uses wavelets coming from a multiple-resolution analysis matched to the shape of the meshed objects, namely formed by spaces of functions refined by pieces: if $C^0(M_0)$ is used to denote the space of the continuous functions of $M_0$ in R and, for j>0, $M_j$ is the mesh obtained by canonically subdividing each facet of $M_{j-1}$ into four, we define the subspace $S_j$ of $C^0(M_0)$ generated by the functions refined by pieces on $M_0$ which is equal to 1 on a given vertex of $M_j$ and 0 on all the others. The values $S_j$ have the property wherein $S_j \in S_{j+1}$ and their union is dense in $C^0(M_0)$. Intuitively, the greater the value of j, the more detailed are the image meshes of all the elements of $S_j$.

The details represented by $S_{j+1}$ but not by $S_j$ correspond to the space $W_j$, $W_j$ designating a supplementary value of $S_j$ in $S_{j+1}$. If $\psi^j$ represents a set of functions forming a base of $W_j$ and $\Phi^0$ a set of functions forming a base of $S_0$, then $\Phi^0 \cup \bigcup \Phi^j$ forms a basis of $C^0(M_0)$: any continuous function $\rho$ defined on $M_0$ with values in $R^3$ is written solely in the following form:

$$\rho = \sum_i c_i \phi_i^0 + \sum_{j \geq 0} \sum_i d_i^j \psi_i^j,$$

where the coefficients $(c_i)_i$ and $(d^j_i)_{i,j}$ belong to $R^3$. It is the values $(d^j_i)_{i,j}$ called wavelet coefficients and corresponding to details added to a rough approximation represented by the values $(c_i)_i$.

At the end of the remeshing, there is a mesh $M_j$ available, geometrically approaching M to within $\in_1$. This mesh $M_j$ is the image of a homeomorphism $\rho_j$ that can be written as follows:

$$\rho^j = \sum_i c_i^j \phi_i^j.$$

The passages from the coefficients $(c^j_i)_{i,j}$ to the coefficients $(c_i)_i$ and $(d^j_i)_{i,j}$ and in reverse are obtained by linear applications called filter banks. These linear applications are given directly by relationships between the basic functions of the spaces $S_j$, $W_j$ and $S_{j+1}$.

LEGENDES DES DESSINS

FIG. 1:

11. Determining $M_0$ from M

12. Determining a parametrization $\rho$

13. Development of $\rho$ in a base of wavelets defined on $M_0$

FIG. 2:

Reprendre des légendes du WPO sauf pour la référence

27: Merging of average coplanar components.

What is claimed is:

1. Method for the encoding of a source mesh (M) representing an object in three dimensions, in which a simple mesh ($M_0$) is determined, this simple mesh having a limited number of facets each defined by vertices and ridges, and then coefficients in a base of wavelets, corresponding to local modifications of said simple mesh ($M_0$), characterized in that the determining (11) of said simple mesh ($M_0$) comprises:

a step (24) of searching for zones, or components, of said source mesh (M), constituted by facets of said source mesh (M) meeting a predetermined coplanarity criterion, a facet of said source mesh being incorporated in one of said components when the maximum angle formed by said facet to be incorporated and all the other facets of said component is smaller than a predetermined threshold $E_2$.

a step (27) of combining components implementing a mean normal computation for each of said components, it being possible for two components to be combined if the angle between their mean normals is below a predetermined threshold.

2. Encoding method according to claim 1, characterized in that said searching step (24) comprises the following steps:

the detection in said source mesh (M) of at least one line of discontinuity;

the assignment of said line of discontinuity to at least one of said facets of the simple mesh ($M_0$) as a ridge.

3. Encoding method according to claim 1, characterized in that said step of detection of a line of discontinuity comprises a step of comparison of the angle formed by two facets of said source mesh with a predetermined threshold angle $E_1$, the ridge between said facets being considered to be a line of discontinuity if said angle is greater than said threshold $E_1$.

4. Encoding method according to claim 1, characterized in that said step (24) of searching for components that meet a criterion of coplanarity also implements an operation of verification of the topological connectedness of said component, and of interruption of the formation of said component, when there is no topological connectedness.

5. Encoding method according to claim 4, characterized in that said operation to check the connectedness advantageously comprises the limiting of the cardinal of said component to a predetermined limit M.

6. Encoding method according to claim 5, characterized in that if said component is not simply a connected component, then the step of searching for a component is reiterated with a new value of said limit M that is smaller than the previous one.

7. Encoding method according to claim 1, characterized in that, from said components, said simple mesh ($M_0$) and the image are determined by a predetermined parametrization of the ridges of said simple mesh ($M_0$) by building, for each of said components, a curve in $R^3$ such that:

said curve is a union of said segments;

if a vertex on the edge of said component belongs to at least two other components, then it belongs to said curve;

if two vertices belonging to at least two other components are connected by a path that is contained in the edge of said component and that contains no other path having this property, then the segment defined by said two vertices belongs to the curve, and vice versa.

8. Encoding method according to claim 1, characterized in that said components are then subdivided into triangular facets corresponding to the simple mesh ($M_0$).

9. Encoding method according to claim 1, characterized in that the determining of said coefficients in a base of wavelets implements a subdivision in each of said facets of the simple mesh ($M_0$) corresponding to the definition of new vertices on said ridges.

10. Encoding method according to claim 9, characterized in that the internal mesh, represented by the image of the new internal points of each of said facets of the simple mesh ($M_0$), is not memorized but deduced from said new vertices.

11. Encoding method according to claim 9, characterized in that the image of the new internal points is determined according to one of the following techniques:

the association, with each ridge middle, of the middle of the path representing its image;

the association, with each ridge middle, of the point of the corresponding path minimizing the distance of Hausdorff between this path and the two new segments formed.

12. Encoding method according to claim 10, characterized in that the images of the points of the edges of the facets representing a component being determined, the images of the internal points are for example determined according to the following techniques:

projection;

computation of the corresponding harmonic function; minimizing the number of subdivisions for a predetermined precision.

13. Application of the encoding method according to claim 1 to at least one of the following fields:

the display of meshed objects in three dimensions on a screen;

the gradual display of meshed objects in three dimensions on a screen, said wavelet coefficients being taken into account as and when they arrive;

the display of the meshed objects in three dimensions on a screen on at least two levels of detail, one level of detail corresponding to a subset of said wavelet coefficients;

the display of different parts of a meshed object with at least two different levels of detail;

the compression of a mesh of a meshed object.

* * * * *